(12) United States Patent
Redberg (10) Patent No.: US 10,708,771 B2
(45) Date of Patent: Jul. 7, 2020

(54) TRANSFERING SOFT TOKENS FROM ONE MOBILE DEVICE TO ANOTHER

(71) Applicant: Fortinet, Inc., Sunnyvale, CA (US)

(72) Inventor: David A. Redberg, New York, NY (US)

(73) Assignee: Fortinet, Inc., Sunnyvale, CA (US)

( * ) Notice: Subject to any disclaimer, the term of this patent is extended or adjusted under 35 U.S.C. 154(b) by 225 days.

(21) Appl. No.: 15/851,250

(22) Filed: Dec. 21, 2017

(65) Prior Publication Data

US 2019/0200218 A1  Jun. 27, 2019

(51) Int. Cl.
| | | |
|---|---|---|
| *H04W 12/04* | (2009.01) | |
| *H04L 9/32* | (2006.01) | |
| *H04W 12/06* | (2009.01) | |
| *H04L 29/06* | (2006.01) | |
| *H04W 4/14* | (2009.01) | |

(52) U.S. Cl.
CPC ........... *H04W 12/04* (2013.01); *H04L 9/3213* (2013.01); *H04L 9/3228* (2013.01); *H04L 63/0807* (2013.01); *H04W 12/06* (2013.01); *H04W 4/14* (2013.01)

(58) Field of Classification Search
CPC ....... H04W 12/04; H04W 12/06; H04W 4/14; H04W 12/08; H04L 9/3213; H04L 9/3228; H04L 63/107; H04L 63/06; H04L 63/102; H04L 63/22; H04L 63/20
See application file for complete search history.

(56) References Cited

U.S. PATENT DOCUMENTS

| | | | |
|---|---|---|---|
| 7,664,626 B1 | 2/2010 | Ferrie | |
| 8,873,752 B1 * | 10/2014 | Machiraju | H04W 12/06 370/331 |
| 9,143,492 B2 | 9/2015 | Redberg et al. | |

(Continued)

FOREIGN PATENT DOCUMENTS

| | | | | |
|---|---|---|---|---|
| EP | 2619941 B1 * | 12/2018 | ............ | H04W 12/06 |
| TW | 201225698 A * | 6/2012 | | |

OTHER PUBLICATIONS

Manuel Koschuch, et al., Token-based authentication for smartphones, Jul. 2013, 2013 International Conference on Data Communication Networking (DCNET), pp. 1-6.*

*Primary Examiner* — Farid Homayounmehr
*Assistant Examiner* — Raied A Salman
(74) *Attorney, Agent, or Firm* — Jaffery Watson Mendonsa & Hamilton LLP (57) ABSTRACT

Systems and methods for securely transferring tokens from one device to another are provided. According to one embodiment, a token transfer request (TTR), requesting transfer of a soft token stored on a first mobile device to a second mobile device, is received by a provisioning server from the first device. A transfer activation code (TAC) is generated by the provisioning server responsive to receipt of token data associated with the soft token from the first device. The token data includes an encrypted token seed bound to the first device. The TAC is delivered to a user of the first device via an authentication server. Unbound token data for the soft token is created by the provisioning server by unbinding the encrypted token seed from the first device. Upon receipt of the TAC from the second device, the unbound token data is transferred to the second device.

26 Claims, 7 Drawing Sheets

(56) References Cited

U.S. PATENT DOCUMENTS

| | | | |
|---|---|---|---|
| 9,386,014 B2 | 7/2016 | Redberg et al. | |
| 9,401,905 B1* | 7/2016 | Kowalski | H04L 63/08 |
| 10,439,814 B1* | 10/2019 | Grubin | H04L 9/0894 |
| 2003/0204726 A1 | 10/2003 | Kefford et al. | |
| 2005/0039016 A1 | 2/2005 | Aissi et al. | |
| 2005/0289343 A1 | 12/2005 | Tahan | |
| 2010/0313019 A1* | 12/2010 | Joubert | G06F 21/313 |
| | | | 713/168 |
| 2011/0123671 A1 | 5/2011 | Hirson et al. | |
| 2011/0208659 A1* | 8/2011 | Easterly | G06Q 20/027 |
| | | | 705/79 |
| 2011/0276478 A1 | 11/2011 | Hirson et al. | |
| 2012/0144461 A1* | 6/2012 | Rathbun | H04L 9/3213 |
| | | | 726/5 |
| 2012/0167186 A1* | 6/2012 | Dietrich | G06F 21/41 |
| | | | 726/6 |
| 2012/0226772 A1* | 9/2012 | Grube | H04L 41/0803 |
| | | | 709/217 |
| 2012/0233678 A1 | 9/2012 | Pal | |
| 2012/0240204 A1 | 9/2012 | Bhatnagar et al. | |
| 2014/0281506 A1* | 9/2014 | Redberg | H04L 63/067 |
| | | | 713/159 |
| 2015/0312250 A1 | 10/2015 | Redberg et al. | |
| 2016/0212617 A1* | 7/2016 | Koshimizu | H04L 9/0844 |
| 2016/0262013 A1 | 9/2016 | Redberg et al. | |
| 2017/0288872 A1* | 10/2017 | Lu | H04L 9/32 |
| 2018/0139210 A1* | 5/2018 | Gideon, III | H04L 63/102 |
| 2018/0332472 A1* | 11/2018 | Lu | H04W 12/0401 |

* cited by examiner

TRANSFERING SOFT TOKENS FROM ONE MOBILE DEVICE TO ANOTHER

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to the field of data security. In particular, embodiments of the present invention relate to a soft token transfer system that can be used to transfer soft tokens from one mobile device to another.

Description of the Related Art

The Internet has enabled many daily activities that earlier used to be performed by physically travelling from one place or another to now being performed online from the comfort of one's home/office, using an Internet enabled computing device that is often times a mobile device. Examples of such online transactions include airline/railway/theater reservations, financial transactions, such as bank transfers, payment for various goods and services via a plethora of e-commerce portals and the like. The computer systems/applications etc. for such transactions are configured in a computing device usually termed a "server" that can be accessed via the Internet by a user using another suitably configured computing device usually termed a "client". Commonly, for each of the online activities, users need to provide credentials, such as a user name and password to their client device that passes the information to the server at issue. Users provide critical/sensitive information, such as bank account information, credit card information, debit card information, smart card information, usernames, passwords, Personal Identification Numbers (PINs) and so forth, while performing online transactions. Such critical information is static in nature and therefore can be intercepted during data exchange between the client and the server and used by unauthorized individuals. Also, weak passwords are easily susceptible to cracking. Additional threats to sensitive data transferred or accessed via online means include malware, viruses, spyware and keyloggers. Thus, there exists a need to provide/enhance security while performing an online activity.

Two-factor authentication (2FA), often referred to as two-step verification, is a security process that has gained tremendous popularity over the years due to its strong security features, as mobile transactions have caught on globally. Following the 2FA model, a user provides two authentication factors to verify himself/herself. 2FA can be contrasted with single-factor authentication (SFA), a security process in which the user provides only one factor— typically a password. Typically, the second factor used in 2FA is a One Time Password (OTP), e.g., sent to the user's mobile number registered previously by the user with the 2FA system. An OTP is a type of password that is valid only for one login session or for a limited time. For example, an OTP may be regenerated each time a user desires to log into a website. OTP solutions prove identities more securely because the password for the user keeps changing. Usually, an OTP is based on randomness and is dynamic in nature. For instance, if a hacker intercepts an OTP value that was already used to conduct an online transaction, he or she will typically not be able to use it since it will be no longer be valid. Due to the random nature of OTPs, a next OTP cannot easily be determined based on observations of previously generated OTPs. Thus, OTP solutions provide increased security to users while performing online activity.

OTPs are based on the concept of a cryptographically-secure pseudo-random number generator (aka CSPRNG). A pseudo-random number generator (PRNG), found in a standard library of most programming languages, is an algorithm that generates a repeatable sequence of numbers that are "random looking;" there are several way to measure how random a sequence is, but the important property that differentiates PRNG from CSPRNG is not really concerned with randomness per-se, but rather with how easy is to predict the next number just by looking at the previous ones. This is important in the context of OTP because obviously an attacker might observer the previously generated OTPs by the system, for example, through a key-logger installed on a user's computer, so it is paramount to make sure that the attacker cannot exploit this knowledge to generate the next OTP. After a suitable CSPRNG has been chosen, it is sufficient that the server and the client agree on a "seed" to be used for the sequence. In this manner, both sides will be able to independently generate the same sequence and thus for the server it will be easy to check if the numbers generated by the client are the same that it generates. As long as the algorithm is truly secure and the "seed" is not leaked, the ability to generate the next number can be considered a good authentication mechanism, since no one else should be able to generate the same sequence. The seed generation can be embedded within an off-line physical device (that is called a hardware-based token) or a programmatically enabled similar representation (called a software-based token a/k/a soft token) in such a manner that leaking of the seed becomes almost impossible. If the device is stolen, it is sufficient to revoke the seed assigned to it and assign a new device to the user (with a new "seed").

As elaborated above, an OTP is generated by hardware-based tokens or software-based tokens. These tokens act like an electronic key to access sensitive information. A hardware-based token is an electronic device carried by a user. The hardware-based token can be easily plugged into a user device and generates an OTP that can be viewed by the user. In contrast, software-based tokens for generating an OTP are typically in the form of an application running on a user's device, with the application making use of the device ID to bind the token to the user device. Software-based tokens are easy to use as users are not required to carry an additional hardware device.

There exist a number of solutions in the market offering software-based token solutions to generate OTPs. However, there are many disadvantages associated with current solutions. One of the disadvantages of software-based tokens is that the solutions follow the approach of binding a token to a user device only at the time of importing the token from a server and such binding does not persist thereafter. Additionally, the token is generated on an external server, and thus, is exposed to security risks. Furthermore, prior solutions focus on manual effort to collect device ID. For example, a user of the device must typically manually enter the device ID upon request into the token generating application on the server side. Also, current solutions are not compatible with different types/versions of user devices and are limited in that they cannot be integrated with various platforms.

Attempts have been made to rectify various of the shortcomings elaborated above. For example, U.S. Pat. No. 9,143,492, which is hereby incorporated by reference in its entirety for all purposes, describes a system for soft token management. In an exemplary embodiment, a mobile device of a user of a secure network resource receives and installs a soft token application. A device fingerprint (e.g., the International Mobile Station Equipment Identity (IMEI) of a cellular mobile device, the International Mobile Subscriber Identity (IMSI) of a SIM card, the a unique device ID (UDID) for iOS devices or a Device ID for Android devices) of the mobile device is programmatically obtained by the soft token application. A token seed for generating a soft token for accessing a secure network resource is requested by the soft token application. Responsive to receipt of the seed by the soft token application, the soft token is generated based on the seed and the soft token is bound to the mobile device by encrypting the seed with the device fingerprint and a hardcoded pre-shared key.

However, since the tokens are bound to the device by encrypting corresponding token seeds using the device fingerprint of the mobile device, it is not possible to move/transfer tokens installed on one mobile device to another since they will not work therein as the device fingerprint of the new mobile device does not match the device fingerprint of the original mobile device. Changing/upgrading a mobile device due to various reasons (e.g., theft, damage or obsolescence) is an increasingly frequent occurrence and in such a situation, the new mobile device needs to be authenticated again with the various applications so as to acquire new tokens for each of them afresh to generate valid OTPs for future 2FA interactions. Since many applications presently require 2FA, there will likely be several such authentications to be performed. This usually requires specific backup and restore procedures recommended by the various applications, using relevant codes provided by the applications providers. As can be appreciated, these numerous disparate procedures are inconvenient for users.

Therefore, there exists a need for systems and methods for transferring tokens from an old mobile device to a new mobile device so that applications requiring 2FA can work seamlessly on the new device.

SUMMARY

Systems and methods are described for securely transferring tokens from one device to another. According to one embodiment, a token transfer request (TTR), requesting transfer of a soft token stored on a first mobile device to a second mobile device, is received by a token provisioning server from a mobile soft token application running on the first mobile device. A transfer activation code (TAC) is generated by the token provisioning server responsive to receipt of token data associated with the soft token from the first mobile device. The token data includes an encrypted token seed bound to the first mobile device. The TAC is caused by the token provisioning server to be delivered to a user of the first mobile device via an authentication server associated with an issuer of the soft token. Unbound token data associated with the soft token is created by the token provisioning server by unbinding the encrypted token seed from the first mobile device. Finally, responsive to receipt of the TAC from the second mobile device the unbound token data is transferred to the second mobile device by the token provisioning server via a mobile soft token application running on the second mobile device.

Other features of embodiments of the present invention will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for securely transferring tokens from one device to another. In an aspect, the system of the present disclosure can include a non-transitory storage device having embodied therein one or more routines operable to enable a user of a first mobile device (e.g., an old mobile device that will no longer be used) to transfer a soft token from the first mobile device to a second mobile device (e.g., a new mobile device that will replace the first mobile device); and one or more processors coupled to the non-transitory storage device and operable to execute the one or more routines, wherein the one or more routines can include: a token transfer request receive module, which when executed by the one or more processors, can receive, from the first mobile device, a token transfer request (TTR) for transfer of the soft token; a transfer activation code generation module, which when executed by the one or more processors, can generate a transfer activation code (TAC) responsive to receipt of data associated with the soft token from the first mobile device; a transfer activation code transfer module, which when executed by the one or more processors, can cause an authentication server to issue the TAC to the user; and a soft token associated data transfer module, which when executed by the one or more processors, can transfer the data associated with the soft token to the second mobile device responsive to receipt from the second mobile device of the TAC.

In another aspect, the data associated with the soft token can be selected from any or a combination of an encrypted token seed, a token serial number, an issuing party, a token type, a One-Time Password (OTP) display length, a counter value, a device fingerprint of the first mobile device, a unique device identification (UDID) of the first mobile device, a flag indicative of whether a personal identification number (PIN) is required, a PIN length, PIN policy attributes, and an issuer field to identify the authentication server.

In yet another aspect, the data associated with the soft token can be deleted from the first mobile device after receipt of the TAC.

In an aspect, the authentication server can authenticate the user before providing the TAC to the user.

In another aspect, the TAC can be issued to the user via a Short Message Service (SMS) message directed to a phone number of the first mobile device, an SMS message directed to a phone number of the second mobile device, an email message directed to an email account of the user or via a phone call to the user. Note that as discussed with reference to FIG. 3, in another aspect, the authentication server can be set to only send the TAC upon positive acknowledgement that the tokens being transferred have been deleted from the first mobile device so as to prevent potential duplication of tokens across multiple devices.

In an aspect, the authentication server can include a 2-factor authentication server.

In another aspect, the transfer activation code transfer module can be configured to automatically transfer the TAC based on system configuration.

In yet another aspect, a token seed for the soft token can be transferred in encrypted format.

In an aspect, the TAC can be valid for a defined time period. In another aspect, the TAC can be sent to the user encoded in a form of a matrix barcode via email or SMS, wherein the matrix barcode can scanned by the second mobile device so as to receive the data associated with the soft token.

In an aspect, the system of the present disclosure elaborates upon a mobile device including: a non-transitory storage device having embodied therein one or more routines operable to enable a user of the mobile device to transfer a soft token from the mobile device to a second mobile device; and one or more processors coupled to the non-transitory storage device and operable to execute the one or more routines, wherein the one or more routines can include: a token transfer request issuance module, which when executed by the one or more processors, can generate and transmit a transfer token request to a token provisioning server; a transfer activation code receive module, which when executed by the one or more processors, can receive, from the token provisioning server, a transfer activation code (TAC), wherein the TAC can be generated by the token provisioning server responsive to receipt of data associated with the soft token; and a token transfer completion module, which when executed by the one or more processors, can enable the user to provide the TAC to the second mobile device so as to further enable the second mobile device to, using the TAC, retrieve and store the data associated with the soft token from the token provisioning server.

In another aspect of the mobile device, the data associated with the soft token can be deleted from the token provisioning server after transfer of the data associated with the soft token to the second mobile device.

In an aspect, present disclosure elaborates upon a method including the steps of receiving, at a token provisioning server, from a first mobile device, a token transfer request (TTR) requesting transfer of a soft token stored on the first mobile device to a second mobile device; generating, at the token provisioning server, a transfer activation code (TAC) responsive to receipt of data associated with the soft token from the first mobile device; causing, by the token provisioning server, the TAC to be transferred to a user of the first mobile device by authentication server; and responsive to receipt of the TAC from the second mobile device, transferring, by the token provisioning server, the data associated with the soft token to the second mobile device.

In the following description, numerous specific details are set forth in order to provide a thorough understanding of embodiments of the present invention. It will be apparent to one skilled in the art that embodiments of the present invention may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of conducting network auditing, it should be appreciated that the same has been done merely to illustrate the invention in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Figure 1:
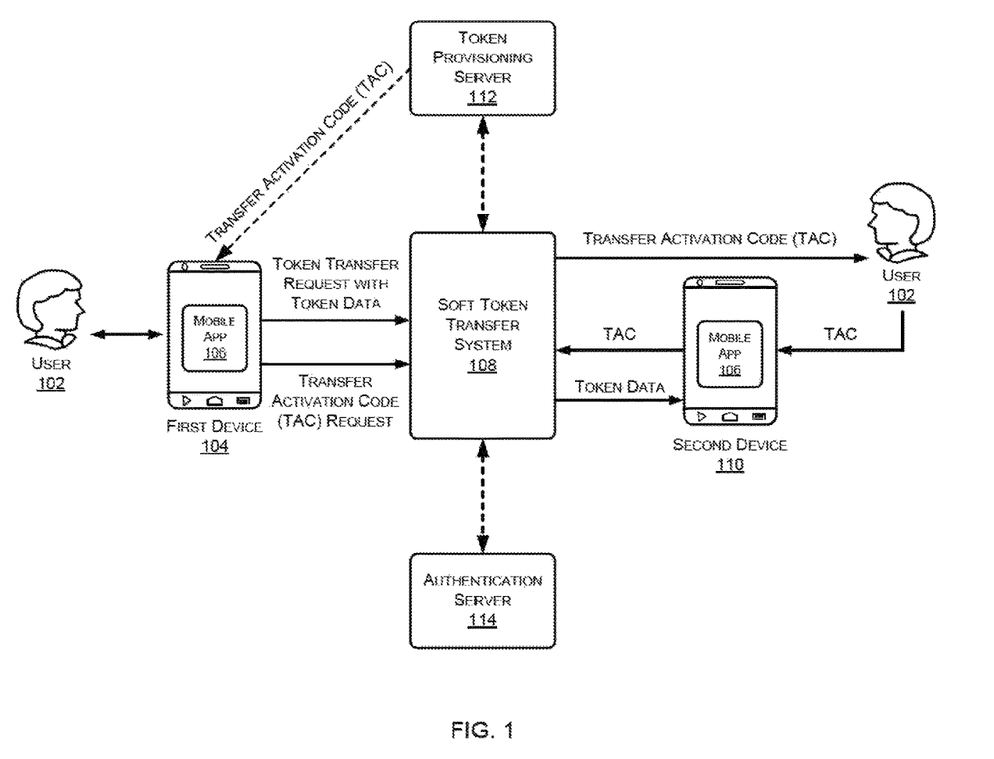
FIG. 1 illustrates a high-level soft token transfer architecture in accordance with an embodiment of the present invention.

FIG. 1 illustrates a high-level soft token transfer architecture in accordance with an embodiment of the present invention. In an aspect, soft token transfer system 108 enables a user 102 to transfer soft tokens (which may be interchangeably referred to herein as simply "tokens") installed on his/her mobile device 104 (which may be interchangeably referred to herein as mobile device 104, first device 104, first mobile device 104 or old device 104) to another mobile device 110 (which may be interchangeably referred to herein as second device 110, second mobile device 110 or new device 110). First device 104 can be, for instance, an old mobile device of user 102 and second device 110 can be a new mobile device of the user 102 that is intended to replace the old mobile device. The tokens to be transferred may be associated with a mobile soft token application (e.g., mobile application 106). An example, of a mobile soft token application is the FORTITOKEN MOBILE mobile app available from the assignee of the present invention.

Figure 4A:
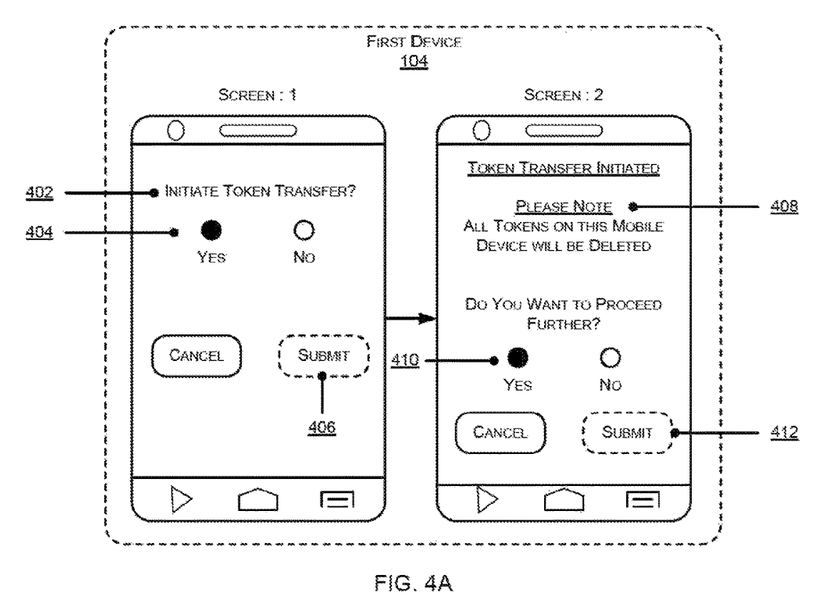
FIG. 4A illustrates user interactions with a soft token transfer process via interface screens presented on an old device from which soft tokens are being transferred in accordance with an embodiment of the present invention.
Figure 4B:
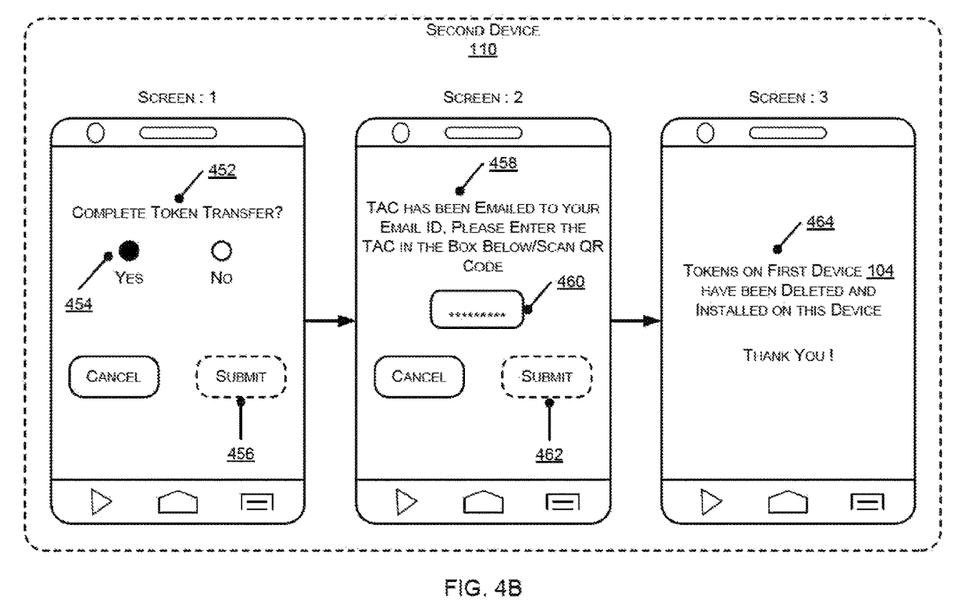
FIG. 4B illustrates user interactions with a soft token transfer process via interface screens presented on a new device to which soft tokens are being transferred in accordance with an embodiment of the present invention.

In the context of the present example, system 108 can be operatively coupled with different mobile devices using various modules configured in the devices and mobile application 106 (which may be interchangeably referred to herein as a mobile app) that can be downloaded on different mobile devices, for instance, device 104 and device 110. Mobile app 106 enables exchange of data between system 108 and the devices as elaborated further below, and also provides a suitable user interface screens for presenting information to user 102 and receiving information from user 102 as illustrated in FIGS. 4A and 4B, for example.

Depending upon the particular implementation, system 108 may be deployed within a public or private server or provided as a service via a private or public cloud and may communicate with devices 104 and 110 via be in operative communications with device 104 and device 110 via the Internet through a Wi-Fi network when devices 104 and 110 are connected to a Wi-Fi network or via a cellular data network when no Wi-Fi is available.

Continuing with the present example, system 108 is also coupled in communication with a token provisioning server (TPS) 112 and a two factor authentication service (e.g., authentication server 114). TPS may be provided as part of a company's product support services. An example of product support services is FORTICARE Support Services provided by the assignee of the present invention. An example of authentication server 114 includes the FORTIAUTHENTICATOR user identity management and single sign-on appliance available from the assignee of the present invention. In an exemplary implementation, when user 102 wants to transfer one or more tokens installed on first device 104 to second device 110, user 102 can start mobile application 106 installed on first device 104, and using mobile application 106, can generate a Token Transfer Request (TTR). System 108 can associate the TTR with data regarding various tokens stored on first device 104, and can enable first device 104 to send the TTR and appropriate token data to system 108 as shown, wherein system 108 can transfer the TTR and the associated token data to TPS 112.

Upon receipt of the TTR and associated token data, system 108 can generate/create a transfer activation code (TAC), that is stored by token provisioning server 112 and associated with the token data.

Responsive to receipt of a TAC request and after user 102 is authenticated via authentication server 114, system 108 can then cause the TAC to be sent to user 102. In one embodiment, responsive to a successful authentication, system 108 causes TPS 112 to provide the TAC to first device 104 of user 102. Alternatively, system 108 can cause authentication server 114 to obtain the TAC from TPS 112 and authentication server 114 may provide the TAC to user 102.

After providing the TAC to user 102, system 108 can cause first device 104 to delete tokens installed on first device 104 and inform user 102 accordingly. As those skilled in the art will appreciate, this can avoid duplication of tokens across multiple devices that can cause authentication and operational errors for various applications to which the tokens belong.

In one embodiment, user 102 is prompted by mobile app 106 or by way of an SMS or email message, for example, providing the TAC to input the TAC into second device 110 to which user 102 wants the tokens to be transferred. Mobile application 106 can enable necessary user interfaces on the second device 110 for such purposes as illustrated by FIG. 4A and/or FIG. 4B, for example.

After the TAC has been input to mobile app 106 running on second device 110, mobile app 106 may deliver the TAC to system 108. Thereafter, system 108 can send the TAC to TPS 112 and when the TAC provided by second device 110 matches the TAC issued to first device 104 TPS 112 can send the token data to second device 110 directly or indirectly via system 108, based on which the token data can be installed on second device 110.

In this manner, system 108 and its interactions with TPS 112, authentication server 114, first device 104 and second device 110 enable a user to transfer soft tokens installed on first device 104 to second device 110.

Figure 2A:
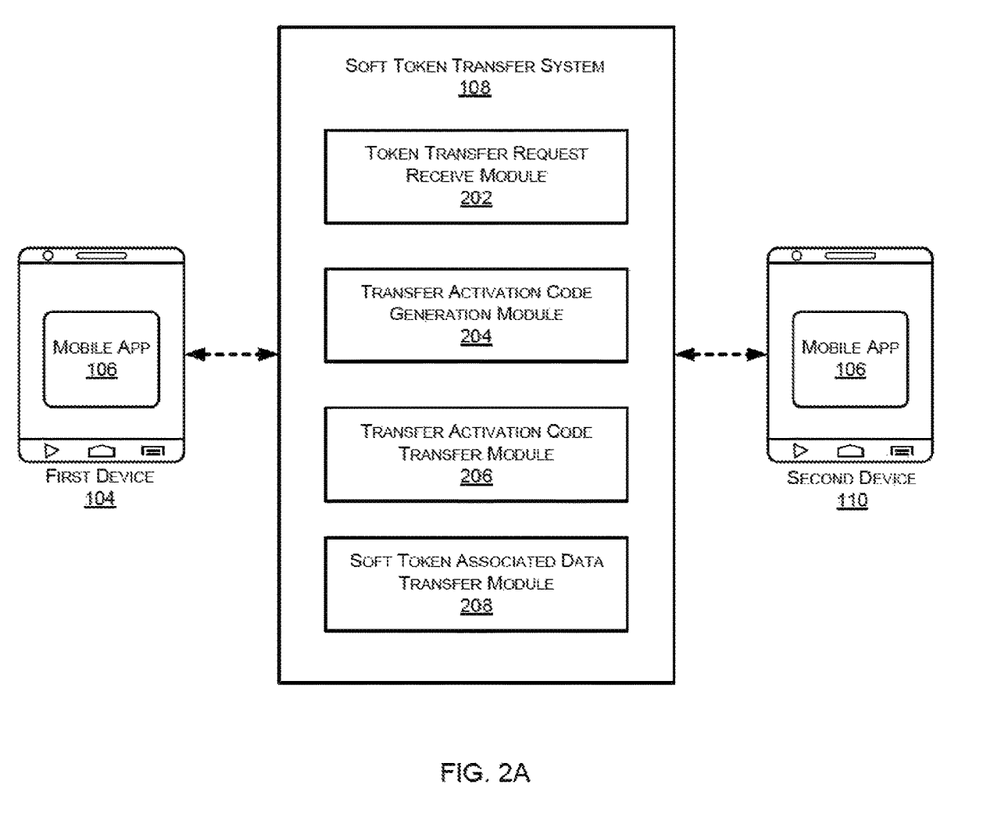
FIGS. 2A and 2B illustrate module diagrams of exemplary soft token transfer systems in accordance with embodiments of the present invention.
Figure 2B:
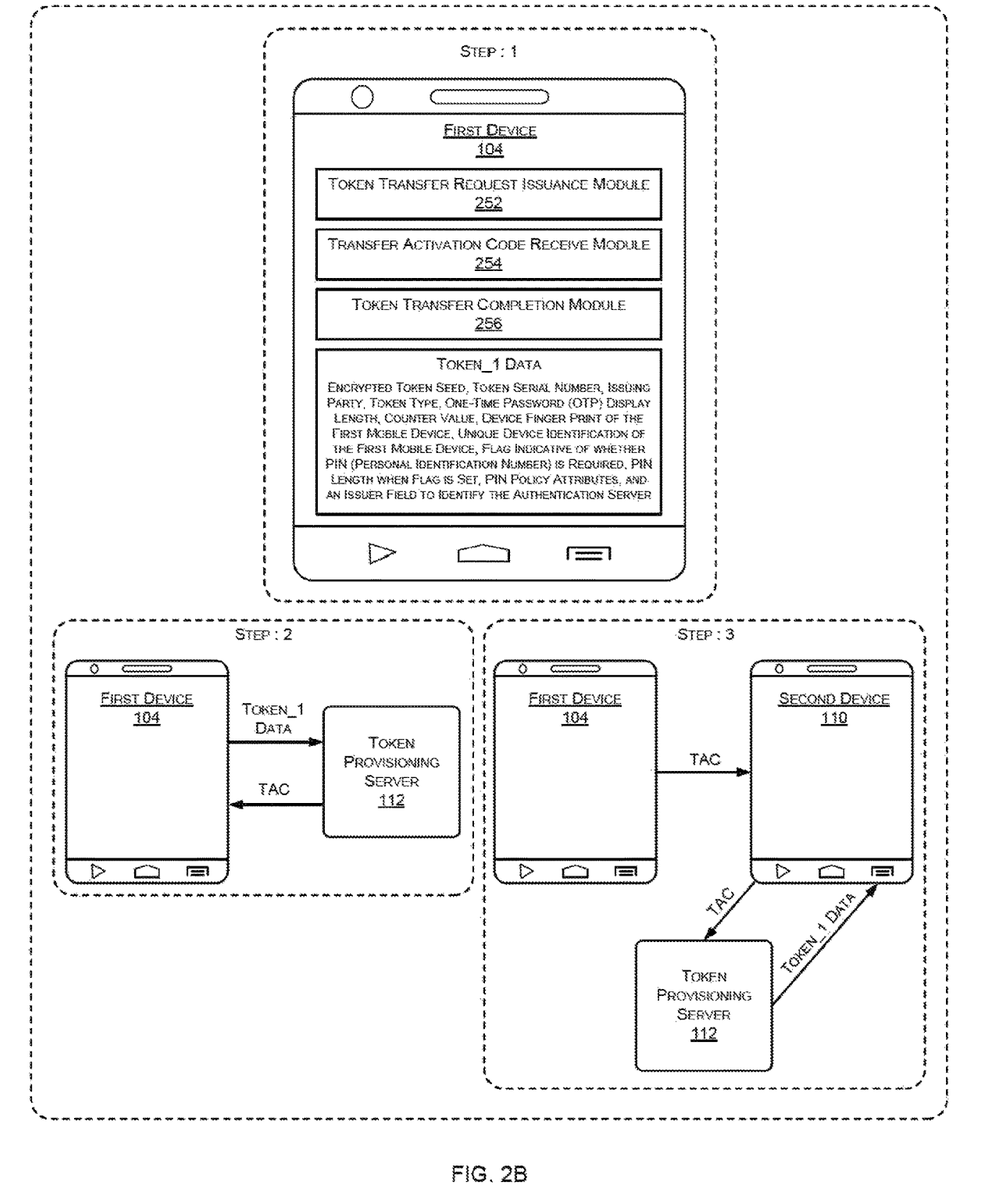

FIGS. 2A and 2B illustrate module diagrams of exemplary soft token transfer systems in accordance with embodiments of the present invention. As noted above with reference to FIG. 1, system 108 can be configured in/at a server/cloud and be in operative communication with various mobile devices, for instance, first device 104 and second device 110, wherein a user (for instance, user 102 described above) can be desirous of transferring soft tokens installed on first device 104 to second device 110. Alternatively, as described with reference to FIG. 3, an intermediate soft token transfer system (e.g., soft token transfer system 108) may not exist and instead the old and new mobile device may interact directly with token provisioning server(s) and authentication server(s) via, for example, a mobile soft token app as described further below.

As illustrated in FIG. 2A, system 108 can include a token transfer request receive module 202, a transfer activation code generation module 204, a transfer activation code transfer module 206, and a soft token associated data transfer module 208. As those skilled in the art will appreciate, there are a variety of architectures that may support the token transfer functionality described herein. For example, one option includes a centralized soft token transfer system (e.g., soft token transfer system 108) that may implement two factor authentication functionality and token provisioning functionality. Another option may use a centralized soft token transfer system, but may offload or rely upon external services or servers to provide two factor authentication functionality and token provisioning functionality. Yet another option is to forego a centralized soft token transfer system and allow the old and new devices to interact directly with a token provisioning server and authentication server(s), thereby providing a distributed system. In view of the foregoing, those skilled in the art will appreciate the modules described below as being associated with soft token transfer system 108 may be implemented within a centralized system or may be distributed as appropriate among the token provisioning server and one or more authentication server(s).

Module 202 is configured to receive, from a transferring device (e.g., first device 104), a token transfer request (TTR), requesting the transfer of one or more soft tokens (e.g., those issued by an authentication server associated with mobile app 106 running on first device 104) installed on first device 104. The TTR may also include data associated with the token(s) to be transferred ("token data"), wherein the token data may include any or a combination of an encrypted token seed, a token serial number, a token type, a One-Time Password (OTP) display length, a counter value, a device fingerprint of first device 104, a flag indicative of whether a personal identification number (PIN) is required, a PIN length, one or more PIN policy attributes, counters for HOTP event-based tokens, and an issuer field to identify the issuing party (and therefore the appropriate authentication server). In one embodiment, one or more portions of the token data, e.g., the token serial numbers, the token seeds and the device fingerprint, may be transferred in encrypted format.

Module 204 is configured generate or caused to be generated by a token provisioning server, for example, a transfer activation code (TAC) responsive to receipt of the token data from the transferring device (e.g., first device 104). In one embodiment, module 204 receives the token data from module 202 along with the corresponding TTR. Upon receipt of the token data, module 204 stores the token data and generates or causes to be generated the TAC. In one embodiment, module 204 can pass the generated TAC to transfer activation code (TAC) transfer module 206 for delivery to first device 104 via email or Short Message Service (SMS). The TAC may be valid for only for a defined time period.

Module 206 is responsible for delivering or causing to be delivered the TAC to first device 104. In one embodiment, module 206 can receive the TAC from module 204. Alternatively, the TAC may have been generated by an external source, e.g., a two factor authentication service. After authenticating the user of first device 104, module 206 can cause the TAC to be issued to the user directly, indirectly via the authentication server or indirectly via the token provisioning server.

In one embodiment, the TAC can be issued to the user via an SMS message directed to a phone number of first device 104, an SMS message directed to a phone number of second device 110, an email message directed to an email account of the user or via a phone call to the user. Alternatively, the TAC can be sent to the user encoded in a form of a linear or matrix barcode via email or SMS. As elaborated further below, module 208 can enable scanning of the linear or matrix barcode by second mobile device 110 so as to enable convenient input of the TAC into second mobile device 110, thereby allowing second device 110 to receive the data associated with the soft token(s) being transferred from first device 104.

In an aspect, module 208 can transfer the data associated with the soft token to the second device 110 responsive to receipt of the TAC from second device 110.

In another aspect, when the TAC has been sent to the user encoded in a form of a linear or matrix barcode via email or SMS by module 206, module 208 can enable scanning of the barcode by second device 110 so as to receive the data associated with the soft token. In yet another aspect, module 208 can delete the token data associated with the soft token from the first device 104 after receipt of the TAC.

FIG. 2B illustrates exemplary modules that can be configured in a mobile device to enable a user of the mobile device to transfer a soft token from the mobile device to a second mobile device. With reference to FIG. 1, the modules described below can be implemented within a mobile soft token application (e.g., mobile app 106) that generates OATH compliant, event-based and time-based OTPs and therefore stores the tokens (and token data associated therewith) that user 102 wishes to transfer to a second device 110. In the context of the present example, the second mobile device is assumed to also be running on the mobile soft token application. In an exemplary embodiment, the modules can include a token transfer request issuance module 252, a transfer activation code receive module 254, and a token transfer completion module 256. The modules can be in operative communication with a token provisioning server (such as TPS 112 in FIG. 1) and an authentication server (for instance, authentication server 114 in FIG. 1).

In an aspect, module 252 can generate and transmit a token transfer request to the token provisioning server (TPS) 112.

In an exemplary embodiment, mobile application 106 can provide appropriate user interfaces (as illustrated by FIG. 4A and/or FIG. 4B, for example) on first device 104 using which user 102 of first device 104 can operate module 252 to issue a token transfer request (TTR). The TTR can be sent direct to token provisioning server 112, as illustrated at step 2, FIG. 2B.

As discussed above, the TTR may include token data associated with a token installed on first device 104 that is to be transferred to second device 110. Such token data (illustrated as token_1 data in FIG. 2B, step 1) can include any or a combination of an encrypted token seed, a token serial number, information identifying the issuing party, a token type, a One-Time Password (OTP) display length, a counter value, a device fingerprint of the transferring device, a flag indicative of whether a personal identification number (PIN) is required, a PIN length and PIN policy attributes. If more than one token is being transferred, the TTR may include token data of all soft tokens installed on first device 104, including those generated by the mobile soft token app initiating the token transfer process and third-party tokens.

In this manner, token provisioning server 112 can receive, from first device 104, the token transfer request (TTR) as well as token data pertaining to one or more tokens on first device 104.

In an aspect, module 254 can receive, from token provisioning server (TPS) 112 or authentication server 114 a transfer activation code (TAC), wherein the TAC can be generated by token provisioning server 112 responsive to receipt of data associated with the token. User 102 can thereafter make use of the TAC to complete the token transfer.

In an aspect, module 254 configured in first device 104 can enable device 104 to receive the TAC, as illustrated in FIG. 2B, step 2. As noted below with reference to FIG. 3, in one embodiment, the TAC can be withheld until first device 104 confirms the tokens being transferred to second device 110 have been deleted from first device 104. This prevent duplication of token across multiple devices.

In an exemplary embodiment, a unique TAC can be generated by TPS 112 for each token installed on device 104. In another exemplary embodiment, only one unique TAC can be generated for all the tokens installed on device 104. As can be readily understood, in the latter case, user 102 need not provide multiple TACs (one for each token) for transfer of tokens to second device 110.

In an exemplary embodiment, module 254 configured in both first device 104 and second device 110 can enable both the devices to receive the TAC enabling user 102 to make use of it. Further, module 254 configured in both the devices can enable user 102 to transfer the TAC from first device 104 to second device 110.

In an aspect, module 256 can enable user 102 to provide the TAC to second device 110 so as to further enable second device 110 to, using the TAC, retrieve and store the data associated with the soft token being transferred from token provisioning server 112.

In an exemplary embodiment, as illustrated at FIG. 2B, step 3, first device 104 can provide the TAC to second device 110 using module 254. Upon receipt of the TAC, using module 256, second device 110 can provide the TAC automatically to TPS 112 and thereafter TPS 112 can automatically provide various token data such as token_1 data as illustrated to second device 110.

In a similar manner, token data of various tokens residing on first device 104 can be transferred to second device 110. In this manner, various applications making use of OTPs on second device 110 can be quickly made operational without the cumbersome procedure of re-provisioning tokens for every application requiring the use of OTPs.

Figure 3:
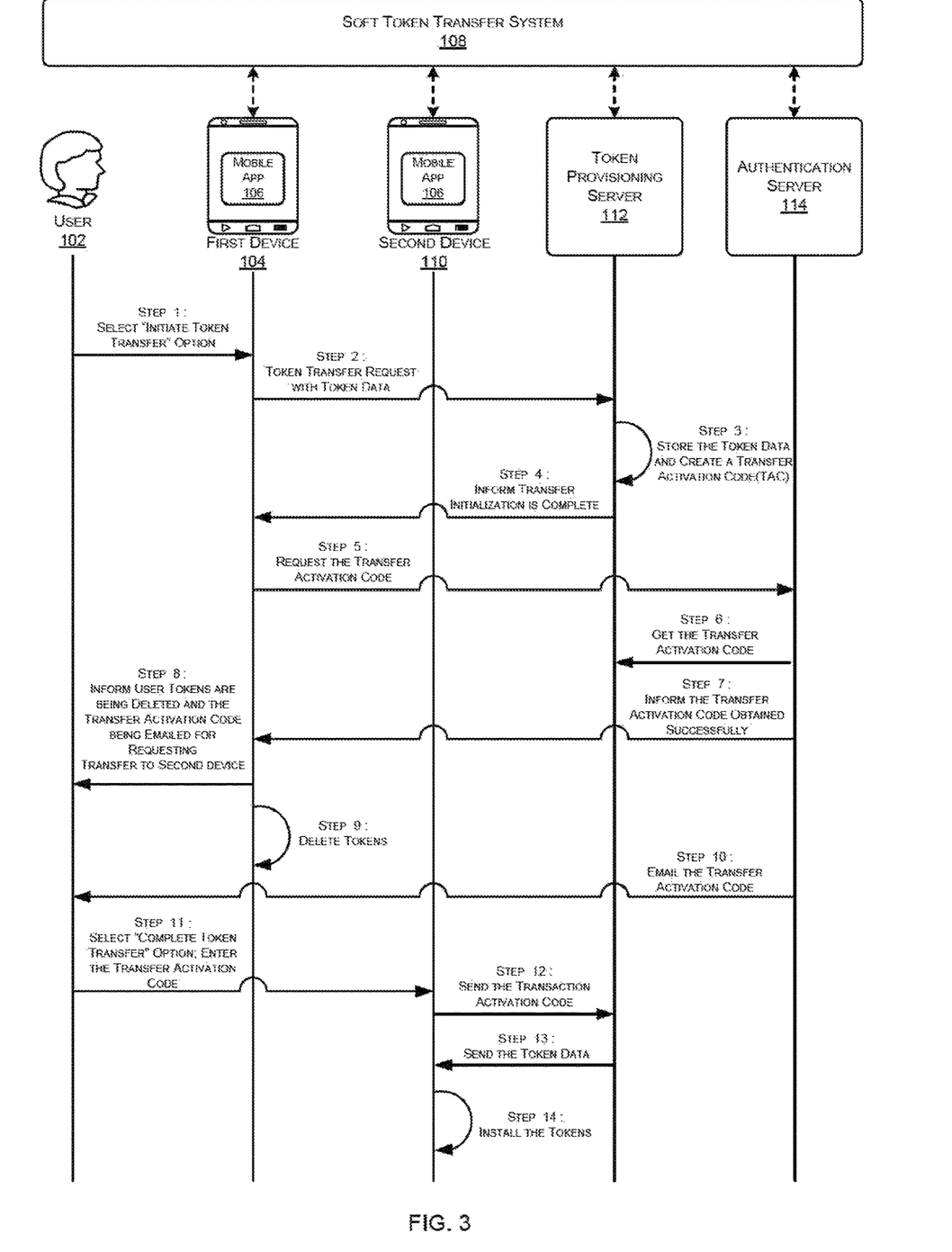
FIG. 3 is a sequence diagram illustrating steps performed by a soft token transfer architecture in accordance with an embodiment of the present invention.

FIG. 3 is a sequence diagram illustrating steps performed by a soft token transfer architecture in accordance with an embodiment of the present invention. While in the context of FIG. 1 an embodiment of the present invention is described with reference to an intermediate soft token transfer system 108 interposed between the old and new mobile devices and TPS 112 and authentication server 114, in other embodiments no such intermediate system is required and the old and new mobile device may interact directly with token provisioning server(s) and authentication server(s) via, for example, a mobile soft token app as described further below.

As illustrated, system 108 of the present disclosure can be operated along with mobile devices as elaborated above, wherein the mobile devices can each include a mobile soft token app (e.g., mobile app 106) storing token data for generating OTPs. As illustrated, mobile application 106 (a mobile soft token app) is assumed to be running on both first device 104 and second device 110 of user 102.

As illustrated at step 1, user 102 can select an 'initiate token transfer' option on first device 104. Necessary user interface screens can be enabled on display of device 104 using mobile app 106 as illustrated by FIG. 4A and/or FIG. 4B, for example.

Upon receipt of such an instruction from user 102, first device 104 can generate a token transfer request (TTR) with token data that can be sent to token provisioning server 112, as illustrated at step 2. The token data can pertain to tokens installed on device 104.

Upon receipt of the TTR with token data, system 108 can enable storage of the token data at TPS 112, and creation of a transfer activation code (TAC), as shown at step 3. In one embodiment, the TAC can be transferred from TPS 112 to authentication server 114 to allow the TAC to be delivered to user 102 via appropriate means (e.g., SMS, email or a phone call). Further, user 102 can be informed via first device 104 that 'transfer initialization is complete' as shown at step 4.

Thereafter, user 102 can, using first device 104, request the TAC from authentication server 114, as shown at step 5. After proper authentication of user 102 using means known in the art (e.g., providing appropriate login credentials to authentication server 114), authentication server 114 can retrieve the TAC from TPS 112 and thereafter inform user 102 on his/her device 104 that 'transfer activation code obtained successfully' as illustrated at step 7. Device 104 can further inform user 102 that user tokens are being deleted and the TAC is being emailed for requesting transfer to second device, as illustrated at step 8. Thereafter, at step 9, tokens on device 104 can be deleted.

At step 10, authentication server 114 can deliver via email, for example, the TAC to user 102. Upon receipt of the TAC, user 102 can select 'complete token transfer' option and enter the TAC on second device 110 as illustrated at step 11. Mobile app 106 installed in second device 110 can provide appropriate user interfaces to user 102 for this purpose as illustrated by FIG. 4A and/or FIG. 4B, for example.

According to one embodiment, in order to provided increased security, prior to step 10, mobile app 106 on first device 104 informs authentication server 114 when the tokens have been deleted. Only then, responsive to receipt of confirmation from mobile app 106 on first device 104 that the tokens to be transferred have been deleted from first device 104, would authentication server 114 provide the TAC (e.g., by email, SMS or phone call) to first device 104. This additional step ensures that the tokens cannot be added to second device 108 if they still exist on first device 104, which could occur in a situation in which step 7 does not occur, for example, due to network error.

Thereafter, second device 110 can send the TAC to TPS 112, as illustrated at step 12. Upon receipt of the TAC, TPS 112 can send the token data to second device 110 as illustrated at step 13 and thereafter second device 110 can install the tokens, as illustrated at step 14. In an embodiment in which the token seeds have been bound to the device on which they were previously installed by encrypting them with a finger print of the device (e.g., a unique device ID) and a hardcoded key provided by a provisioning server (e.g., TPS 112) as described in U.S. Pat. No. 9,143,492 (which has previously been incorporated herein by reference), before transferring the token data to second device 110, TPS 112 unbinds the token seeds from first device 104 by decrypting the token seeds with the finger print of first device 104 and the hardcoded pre-shared key (shared by the first device and TPS 112). In an alternative embodiment, the mobile soft token app running on the first device may perform the unbinding before issuing the TRR and may include therein as part of the token data an encrypted version of the token seed that is no longer bound to the first device. During installation of the tokens on second device 110, mobile app 106 can bind the tokens to second device 110 by encrypting the token seeds based on a fingerprint of second device 110 and the hardcoded-pre-shared key.

FIG. 4A illustrates user interactions with a soft token transfer process via interface screens presented on a first device (e.g., an old device) from which soft tokens are being transferred in accordance with an embodiment of the present invention.

As illustrated at screen 1, upon initiating a soft token transfer process enabled by embodiments of the present invention, an appropriate message 402 can be displayed on first device 104 (typically, an old mobile device being replaced) of a user 102 confirming, for instance, whether user 102 wants to transfer soft tokens installed on first device 104 to a second device 110 (typically, a new mobile device replacing the old mobile device). Upon user 102 selecting the 'Yes' option 404, and further the CTA (call to action) 'submit' button 406, token transfer can be initiated.

Accordingly, the display of first device 104 can change as illustrated in Screen 2. A cautionary message 408 indicating 'All tokens on this mobile will be deleted' in case user 102 proceeds further can be displayed. Upon user 102 selecting the 'Yes' option as shown at 410 and further the CTA (call to action) 'submit' button 412, token transfer can proceed further.

FIG. 4B illustrates user interactions with a soft token transfer process via interface screens presented on a second device (e.g., the new device) to which soft tokens are being transferred in accordance with an embodiment of the present invention.

After completion of steps as above, as illustrated in FIG. 4B, user 102 can attempt to complete token transfer to second device 110. As illustrated at screen 1, at 452, user 102 can be asked to reconfirm whether he/she wants to complete token transfer to second device 110. Upon the user 102 selecting 'Yes' option 454, and further the CTA (call to action) 'submit' button 456, token transfer can proceed further.

As elaborated above, system of the present disclosure can generate a transfer activation code (TAC), and can further email the TAC to user 102's email address. As shown in Screen 2, a message 458 can accordingly be displayed. Further, embodiments of the present invention can provide an appropriate user interface, for instance a text entry box 460 into which user 102 can input the TAC by retrieving it from his/her email, for example. Thereafter user 102 can press submit button 462.

Upon such an action, as illustrated in screen 3, the system of the present disclosure can proceed to delete tokens from first device 104 of the user 102, and install the same on second device 110. Upon completion of the process, an appropriate message 464 can be displayed on the display of the second device 110 informing user 102 that the token transfer process has been completed.

Figure 5:
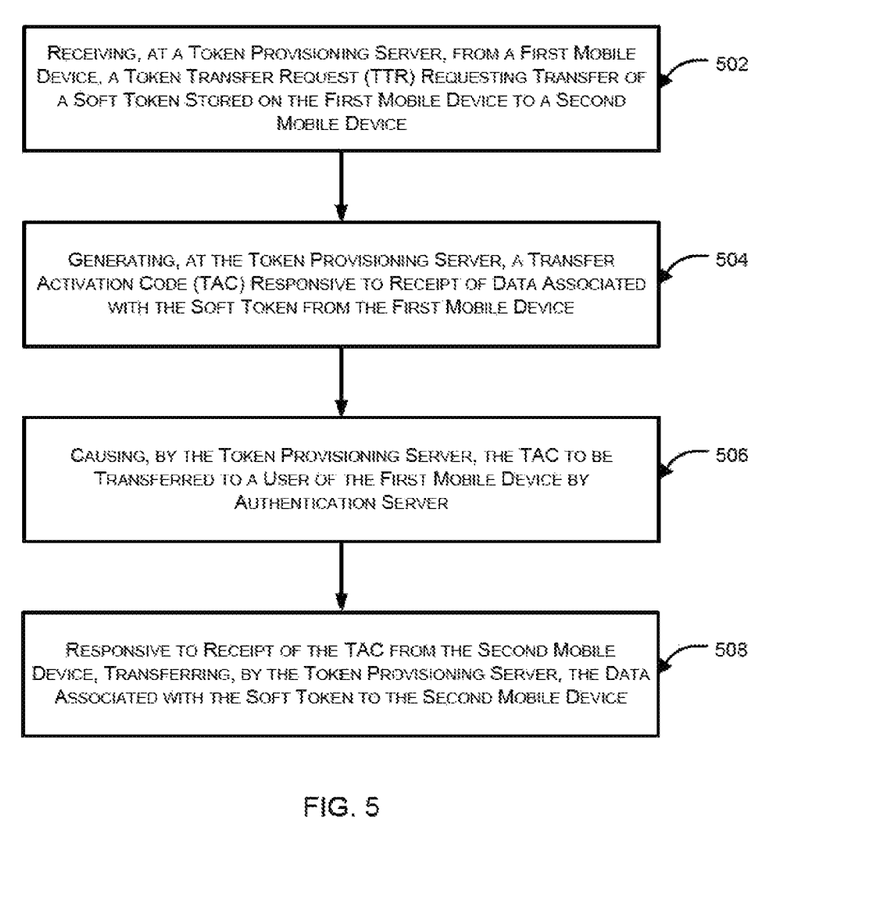
FIG. 5 is a flow diagram illustrating a method of transferring a soft token from one mobile device to another in accordance with an embodiment of the present invention.

FIG. 5 is a flow diagram illustrating a method of transferring a soft token from one mobile device to another in accordance with an embodiment of the present invention.

In an aspect, the method can include, at step 502, receiving, at a token provisioning server, from a first mobile device (the transferring device), a token transfer request (TTR) requesting transfer of a soft token stored on the first mobile device to a second mobile device. Further, the method can include, at step 504, generating, at the token provisioning server, a transfer activation code (TAC) responsive to receipt of data associated with the soft token from the first mobile device. At step 506, the method can include causing, by the token provisioning server, the TAC to be transferred to a user of the first mobile device via an authentication server, and at step 508 the method can include, responsive to receipt of the TAC from the second mobile device (the receiving device), transferring, by the token provisioning server, the data associated with the soft token to the second mobile device.

In an aspect, the data associated with the soft token can be selected from any or a combination of an encrypted token seed, a token serial number, an issuing party, a token type, a One-Time Password (OTP) display length, a counter value, a device fingerprint of the first mobile device (e.g., a unique device identification (UDID) of the first mobile device), a flag indicative of whether a personal identification number (PIN) is required, a PIN length, PIN policy attributes, and an issuer field to identify the authentication server.

In another aspect, the method can further include deleting the data associated with the soft token from the first mobile device after receipt of the TAC.

In yet another aspect, the authentication server can authenticate the user before providing the TAC to the user.

In an aspect of the method, the TAC can be issued to the user via a Short Message Service (SMS) message directed to a phone number of the transferring mobile device, an SMS message directed to a phone number of the transferring mobile device, an email message directed to an email account of the user or via a phone call to the user.

In another aspect, the authentication server can include a 2-factor authentication server.

In yet another aspect of the method, the TAC can be sent to the user encoded in a form of a matrix barcode via email or SMS.

Figure 6:
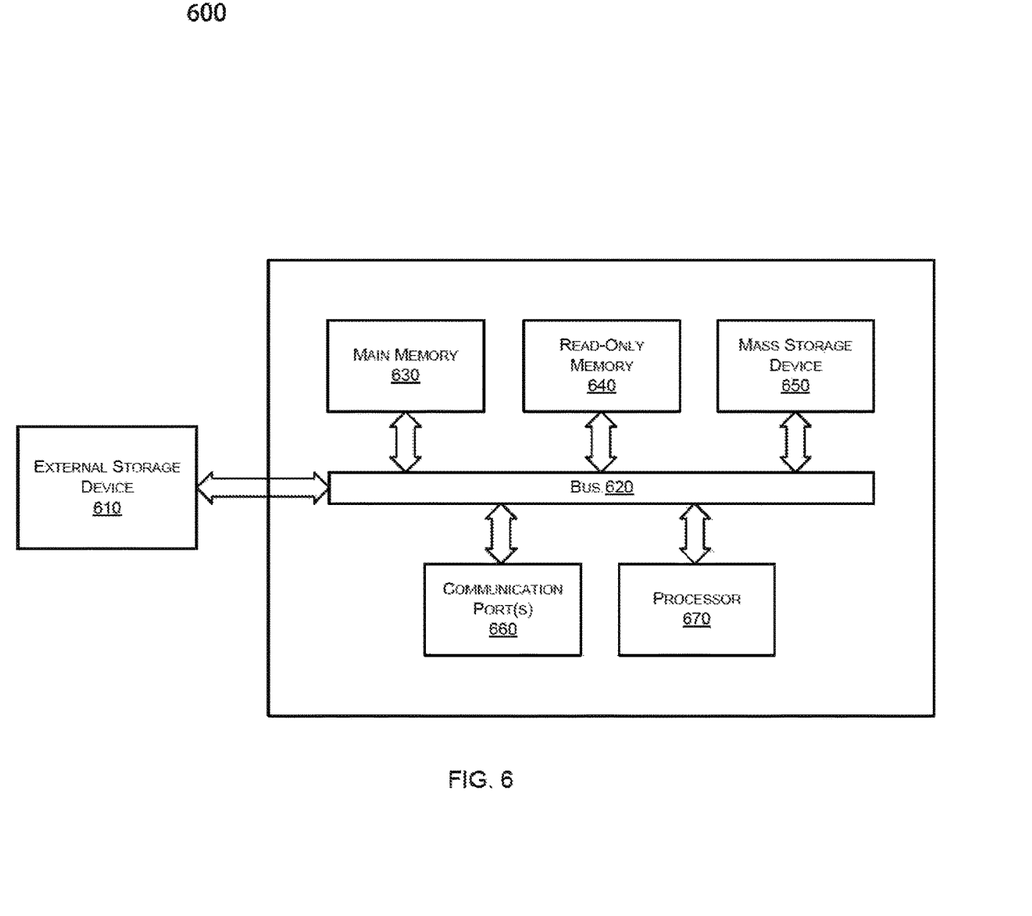
FIG. 6 illustrates an exemplary computer system in which or with which embodiments of the present invention may be utilized.

FIG. 6 illustrates an exemplary computer system 600 in which or with which embodiments of the present invention may be utilized. Computer system 600 may represent all or a portion of a token provisioning server (e.g., token provisioning server 112), a centralized soft token transfer system (e.g., soft token transfer system 108), an authentication server (e.g., authentication server 114) or a mobile device (e.g., first device 104 and/or second device 110).

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown in the figure, computer system 600 includes an external storage device 610, a bus 620, a main memory 630, a read only memory 640, a mass storage device 650, communication port 660, and a processor 670. A person skilled in the art will appreciate that computer system 600 may include more than one processor and communication ports.

Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention.

Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system 600 connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g., start-up or BIOS instructions for processor 670. SANs and VSANs may also be deployed.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc. Bus 620 communicatively couples processor(s) 670 with the other memory, storage and communication blocks.

Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system 600. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:
   receiving, by a token provisioning server, from a mobile soft token application running on a first mobile device, a token transfer request (TTR) requesting transfer of a soft token stored on the first mobile device to a second mobile device;
   generating, by the token provisioning server, a transfer activation code (TAC) responsive to receipt of token data associated with the soft token from the first mobile device, wherein the token data includes an encrypted token seed bound to the first mobile device;
   causing, by the token provisioning server, the TAC to be delivered to a user of the first mobile device via an authentication server associated with an issuer of the soft token;
   creating, by the token provisioning server, unbound token data associated with the soft token by unbinding the encrypted token seed from the first mobile device;
   responsive to receipt of the TAC from the second mobile device, transferring, by the token provisioning server, the unbound token data to the second mobile device via a mobile soft token application running on the second mobile device.

2. The method of claim 1, wherein said unbinding the encrypted token seed from the first mobile device comprises decrypting the encrypted token seed based on a fingerprint of the first mobile device and a key shared by the first mobile device and the token provisioning server.

3. The method of claim 1, wherein the token data associated with the soft token further includes any or a combination of a token serial number, an issuing party, a token type, a One-Time Password (OTP) display length, a counter value, a device fingerprint of the first mobile device, a flag indicative of whether a personal identification number (PIN) is required, a PIN length, PIN policy attributes, and an issuer field to identify the authentication server.

4. The method of claim 1, further comprising deleting the token data associated with the soft token from the first mobile device after receipt of the TAC.

5. The method of claim 1, wherein the authentication server authenticates the user before providing the TAC to the user.

6. The method of claim 1, wherein the TAC is delivered to the user via a Short Message Service (SMS) message directed to a phone number of the first mobile device, an email message directed to an email account of the user or via a phone call to the user on the phone number of the first mobile device.

7. The method of claim 6, wherein the TAC is delivered to the user encoded in a form of a linear barcode or a matrix barcode via email or SMS.

8. The method of claim 1, wherein the authentication server comprises a 2-factor authentication server.

9. The method of claim 1, wherein said causing, by the token provisioning server, the TAC to be delivered to a user of the first mobile device via an authentication server associated with an issuer of the soft token comprises preventing potential duplication of the soft token across multiple mobile devices by withholding, by the authentication server, delivery of the TAC to the user of the first mobile device until the authentication server has received confirmation from the mobile soft token application running on the first mobile device that the soft token has been deleted from the first mobile device.

10. A system comprising:
a non-transitory storage device having embodied therein instructions representing a soft token transfer system; and
one or more processors coupled to the non-transitory storage device and operable to execute the soft token transfer system to perform a method comprising:
receiving from a mobile soft token application running on a first mobile device, a token transfer request (TTR) requesting transfer of a soft token stored on the first mobile device to a second mobile device;
generating a transfer activation code (TAC) responsive to receipt of token data associated with the soft token from the first mobile device, wherein the token data includes an encrypted token seed bound to the first mobile device;
causing the TAC to be delivered to a user of the first mobile device;
creating unbound token data associated with the soft token by unbinding the encrypted token seed from the first mobile device;
responsive to receipt of the TAC from the second mobile device, transferring the unbound token data to the second mobile device via a mobile soft token application running on the second mobile device.

11. The system of claim 10, wherein said causing the TAC to be delivered to a user of the first mobile device comprises causing the TAC to be delivered to the user via an authentication server associated with an issuer of the soft token.

12. The system of claim 11, wherein the token data associated with the soft token further includes any or a combination of a token serial number, an issuing party, a token type, a One-Time Password (OTP) display length, a counter value, a device fingerprint of the first mobile device, a flag indicative of whether a personal identification number (PIN) is required, a PIN length, PIN policy attributes, and an issuer field to identify the authentication server.

13. The system of claim 11, wherein the authentication server comprises a 2-factor authentication server.

14. The system of claim 10, wherein said unbinding the encrypted token seed from the first mobile device comprises decrypting the encrypted token seed based on a fingerprint of the first mobile device and a key shared by the first mobile device and the token provisioning server.

15. The system of claim 10, wherein the method further comprises causing the token data associated with the soft token to be deleted from the first mobile device after receipt of the TAC.

16. The system of claim 10, wherein the method further comprises authenticating the user before providing the TAC to the user.

17. The system of claim 10, wherein the TAC is delivered to the user via a Short Message Service (SMS) message directed to a phone number of the first mobile device, an email message directed to an email account of the user or via a phone call to the user on the phone number of the first mobile device.

18. The system of claim 17, wherein the TAC is delivered to the user encoded in a form of a linear barcode or a matrix barcode via email or SMS.

19. The system of claim 10, wherein said causing the TAC to be delivered to a user of the first mobile device comprises preventing potential duplication of the soft token across multiple mobile devices by withholding delivery of the TAC to the user of the first mobile device until confirmation has been received from the mobile soft token application running on the first mobile device that the soft token has been deleted from the first mobile device.

20. A non-transitory computer-readable storage medium embodying a set of instructions, which when executed by one or more processors of one or more computer systems, causes the one or more processors to perform a method comprising:
receiving from a mobile soft token application running on a first mobile device, a token transfer request (TTR) requesting transfer of a soft token stored on the first mobile device to a second mobile device;
generating a transfer activation code (TAC) responsive to receipt of token data associated with the soft token from the first mobile device, wherein the token data includes an encrypted token seed bound to the first mobile device;
causing the TAC to be delivered to a user of the first mobile device;
creating unbound token data associated with the soft token by unbinding the encrypted token seed from the first mobile device;
responsive to receipt of the TAC from the second mobile device, transferring the unbound token data to the second mobile device via a mobile soft token application running on the second mobile device.

21. The non-transitory computer-readable storage medium of claim 20, wherein said unbinding the encrypted token seed from the first mobile device comprises decrypting the encrypted token seed based on a fingerprint of the first mobile device and a key shared by the first mobile device and the token provisioning server.

22. The non-transitory computer-readable storage medium of claim 21, wherein an authentication server of the one or more computer systems authenticates the user before providing the TAC to the user and wherein the authentication server is associated with an issuer of the soft token.

23. The non-transitory computer-readable storage medium of claim 22, wherein the authentication server comprises a 2-factor authentication server.

24. The non-transitory computer-readable storage medium of claim 23, wherein said causing the TAC to be delivered to a user of the first mobile device comprises causing the TAC to be delivered to the user via the authentication server.

25. The non-transitory computer-readable storage medium of claim 24, wherein said causing the TAC to be delivered to a user of the first mobile device comprises preventing potential duplication of the soft token across multiple mobile devices by withholding, by the authentication server, delivery of the TAC to the user of the first mobile device until the authentication server has received confirmation from the mobile soft token application running on the first mobile device that the soft token has been deleted from the first mobile device.

26. The non-transitory computer-readable storage medium of claim 20, wherein the token data associated with the soft token further includes any or a combination of a token serial number, an issuing party, a token type, a One-Time Password (OTP) display length, a counter value, a device fingerprint of the first mobile device, a flag indicative of whether a personal identification number (PIN) is required, a PIN length, PIN policy attributes, and an issuer field to identify the authentication server.

* * * * *